US012584939B2

(12) United States Patent
Yan et al.

(10) Patent No.: US 12,584,939 B2
(45) Date of Patent: Mar. 24, 2026

(54) ACCELEROMETER HAVING A DIFFERENTIAL CAPACITANCE BETWEEN DETECTING PLATES AND DETECTING ELECTRODES

(71) Applicant: AAC Kaitai Technologies (Wuhan) CO., LTD, Wuhan (CN)

(72) Inventors: Shitao Yan, Wuhan (CN); Xiao Kan, Wuhan (CN); Zhao Ma, Wuhan (CN); Zhan Zhan, Wuhan (CN); Shan Yang, Wuhan (CN); Yang Li, Wuhan (CN); Veronica Tan, Singapore (SG); Kahkeen Lai, Singapore (SG); Hongtao Peng, Wuhan (CN); Houming Chong, Johor (MY); Zaixiang Pua, Singapore (SG)

(73) Assignee: AAC Kaital Technologies (Wuhan) CO., LTD, Wuhan (CN)

( * ) Notice: Subject to any disclaimer, the term of this patent is extended or adjusted under 35 U.S.C. 154(b) by 332 days.

(21) Appl. No.: 18/399,706

(22) Filed: Dec. 29, 2023

(65) Prior Publication Data

US 2024/0345127 A1     Oct. 17, 2024

Related U.S. Application Data

(63) Continuation of application No. PCT/CN2023/087662, filed on Apr. 11, 2023.

(51) Int. Cl.
*G01P 15/125* (2006.01)
*G01P 15/18* (2013.01)

(52) U.S. Cl.
CPC ............ *G01P 15/125* (2013.01); *G01P 15/18* (2013.01)

(58) Field of Classification Search
CPC .............................. G01P 15/18; G01P 15/125
See application file for complete search history.

(56) References Cited

U.S. PATENT DOCUMENTS

2021/0072280 A1*  3/2021  Liukku ................. G01P 15/125
2025/0369995 A1*  12/2025  Meyer .................... G01P 15/13

* cited by examiner

*Primary Examiner* — Eric S. McCall
(74) *Attorney, Agent, or Firm* — Wiersch Law Group

(57) ABSTRACT

The present invention relates to an accelerometer, which comprises a substrate and detecting devices. The substrate is provided with supporting anchor points and electrode fixing anchor points; the detecting device comprises two detecting plates and corresponding detecting electrodes, and the detecting electrodes are connected to the electrode fixing anchor points through connecting arms; the detecting plate is elastically connected to the supporting anchor point, the two detecting plates are asymmetrically arranged with respect to axes of the supporting anchor points, and the two detecting plates are parallel to each other and in opposite directions; and the detecting electrodes and the detecting plates are arranged at intervals to form a detecting capacitor. The wiring of in-plane detecting electrodes of different detecting devices can be separated, and wire crossing can be avoided to reduce the influence of parasitic capacitance caused by complex wiring, thus improving the detection accuracy of the accelerometer.

8 Claims, 5 Drawing Sheets

ACCELEROMETER HAVING A DIFFERENTIAL CAPACITANCE BETWEEN DETECTING PLATES AND DETECTING ELECTRODES

TECHNICAL FIELD

The present invention relates to the technical field of acceleration detection, in particular to an accelerometer.

BACKGROUND

A micromechanical accelerometer is a device for detecting acceleration. Some existing micromechanical accelerometers employ multiple detecting devices to detect acceleration in different directions, and multiple detecting structures are provided to work together for differential detection, thereby improving detection sensitivity and accuracy. However, this structure leads to complex wiring of detecting electrodes, with the wires crossing each other, which can result in parasitic capacitance and interfere with the accuracy of the measurement.

SUMMARY

The present invention provides an accelerometer to address the issues of susceptibility to interference and low detection accuracy in traditional accelerometers.

The present invention provides an accelerometer, comprising:

a substrate provided with a plurality of anchor points, the anchor points at least comprising supporting anchor points and electrode fixing anchor points which are arranged adjacently; and detecting devices, each comprising two detecting plates and corresponding detecting electrodes, the detecting electrodes being connected to the electrode fixing anchor points through connecting arms, and the corresponding detecting plate being elastically connected to the supporting anchor point adjacent to the electrode fixing anchor points, to reduce the influence of deformation of the substrate on a relative distance between the detecting plate and the detecting electrode; the two detecting plates being asymmetrically arranged with respect to axes of the supporting anchor points to which the detecting plates are connected, and structurally asymmetric parts of the two detecting plates being parallel to each other and in opposite directions; the two detecting plates being used for accessing carrier driving signals with opposite phases and forming a differential driving detection structure, the detecting electrodes and the detecting plates being arranged at intervals to form a detecting capacitor, and the detecting electrodes comprising in-plane detecting electrodes and out-of-plane detecting electrodes;

wherein the accelerometer is provided with two detecting devices, the two detecting devices are located in a same plane, the detecting plates in the two detecting devices are perpendicular to each other, and the two detecting plates in the same detecting device are adjacently arranged; when the accelerometer is used for detection, the two detecting plates in the same detecting device generate opposite changes in distance with respect to the detecting electrodes respectively; and the accelerometer obtains a detection result by analyzing a change of differential capacitance between the detecting plates and the detecting electrodes.

In a possible implementation, the detecting plate comprises a hollow mounting area, the detecting electrodes comprise in-plane detecting electrodes and out-of-plane detecting electrodes, the in-plane detecting electrode is located in the mounting area to form an in-plane detecting capacitor together with the detecting plate, the accelerometer further comprises an upper cover which covers the substrate, and the out-of-plane detecting electrode is arranged on the substrate or the upper cover, spaced apart from the detecting plate, to form an out-of-plane detecting capacitor together with the detecting plate.

In a possible implementation, the detecting plate has a plurality of detecting parts inside the mounting area, the plurality of detecting parts are arranged at intervals in an axial direction of the supporting anchor point, the in-plane detecting electrode has a plurality of fitting parts arranged at intervals, and the detecting parts and the fitting parts cooperate with each other to form an in-plane detecting capacitor.

In a possible implementation, each detecting plate comprises two in-plane detecting electrodes, the connecting arms and the electrode fixing anchor points are located in the mounting area, the two in-plane detecting electrodes are connected with the two electrode fixing anchor points through the connecting arms respectively, and the two in-plane detecting electrodes are symmetrically arranged and spaced in an axial direction of the supporting anchor point.

In a possible implementation, the two electrode fixing anchor points connected to the in-plane detecting electrodes are located on a same side of the axis of the supporting anchor point connected to the detecting plate.

In a possible implementation, the detecting electrodes comprise a plurality of out-of-plane detecting electrodes, and the plurality of out-of-plane detecting electrodes corresponding to the same detecting plate are arranged on two sides of the axis of the supporting anchor point.

In a possible implementation, the in-plane detecting electrodes located in different detecting plates in the same detecting device are connected to each other.

In a possible implementation, two ends of the two detecting plates of the same detecting device are respectively aligned.

The present invention provides an accelerometer, which comprises a substrate and detecting devices. The substrate is provided with supporting anchor points and electrode fixing anchor points which are arranged adjacently; the detecting device comprises two detecting plates and corresponding detecting electrodes, and the detecting electrodes are connected to the electrode fixing anchor points through connecting arms; the detecting plate is elastically connected to the supporting anchor point, the two detecting plates are asymmetrically arranged with respect to axes of the supporting anchor points, and the two detecting plates are parallel to each other and in opposite directions; and the detecting electrodes and the detecting plates are arranged at intervals to form a detecting capacitor. Two detecting devices are provided for the accelerometer, the two detecting devices are located in the same plane, the detecting plates in the two detecting devices are perpendicular to each other, and the two detecting plates in the same detecting device are adjacently arranged. The wiring of in-plane detecting electrodes of different detecting devices can be separated, and wire crossing can be reduced to reduce the influence of parasitic capacitance caused by complex wiring, thus improving the detection accuracy of the accelerometer. It should be understood that the above general description and the following detailed description are only exemplary, and do not limit the present invention.

LIST OF REFERENCE NUMERALS

100—substrate; 1—detecting device; 11—detecting plate; 111—detecting part; 12—detecting electrode; 121—in-plane detecting electrode; 121a—fitting part; 13—mounting area; 14—connecting arm; 2—supporting anchor point; 3—electrode fixing anchor point; 4—torsion spring.

The accompanying drawings, which are incorporated in and constitute a part of this specification, illustrate embodiments consistent with the present invention and together with the specification, serve to explain the principles of the present invention.

DETAILED DESCRIPTION OF EMBODIMENTS

To gain a better understanding of the technical solutions of the present application, embodiments of the present application will be described in detail below in combination with the attached drawings.

It should be noted that the described embodiments are only illustrative ones, and are not all possible ones of the present application. Based on the embodiments of the present application, all other embodiments obtained by those of ordinary skill in the art without creative labor should fall within the scope of protection of the present application.

Terms used in the embodiments of the present application are merely for the purpose of describing specific embodiments, and are not intended to limit the present application. As used in the embodiments of the present application and the appended claims, the singular forms "a", "said" and "the" are also intended to include the plural forms, unless other meanings are clearly indicated in the context.

It should be understood that the term "and/or" herein signifies the relationship between associated objects, denoting three possible relationships. For example, A and/or B may mean A alone; A and B; and B alone. In addition, the character "/" herein generally indicates that the associated objects have an "or" relationship.

It should be noted that the directional words such as "above", "below", "left" and "right" described in the embodiments of the present application are described based on the attached drawings, and should not be understood as limitations to the embodiments of the present application. In addition, in this context, it should be understood that when an element is mentioned as being connected to another element ("above" or "below"), it means that the element can be directly connected to the other element ("above" or "below") or indirectly connected through an intermediate element.

Figure 1:
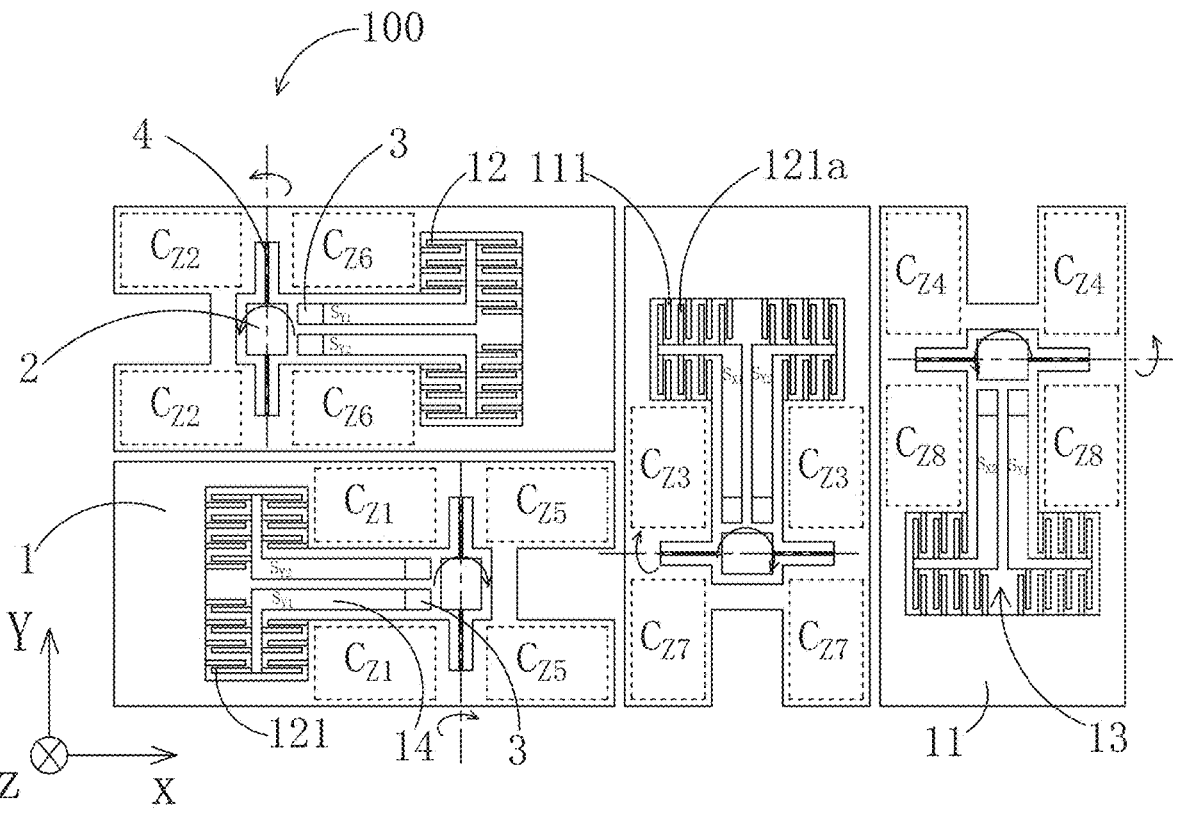
FIG. 1 is a structural schematic diagram of an implementation of an accelerometer provided by the present invention.
Figure 2:
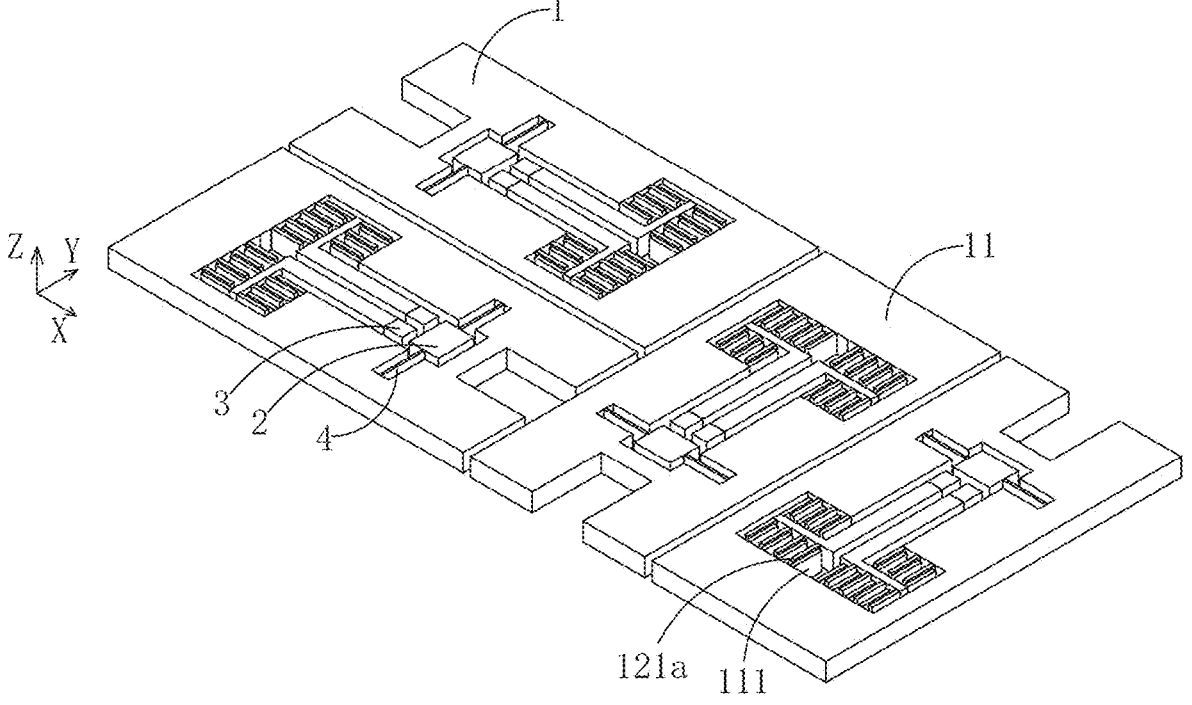
FIG. 2 is a structural schematic diagram of an implementation of an accelerometer provided by the present invention from another perspective.

As shown in FIGS. 1 and 2, the present invention provides an accelerometer, which comprises a substrate 100 and detecting devices 1, wherein the substrate 100 is provided with anchor points, and the anchor points at least comprise supporting anchor points 2 and electrode fixing anchor points 3 which are arranged adjacently; the detecting device 1 comprises two detecting plates 11 and corresponding detecting electrodes 12, and the detecting electrodes 12 are connected to the electrode fixing anchor points 3 through connecting arms 14; the corresponding detecting plate 11 is elastically connected to the supporting anchor point 2 adjacent to the electrode fixing anchor points, to reduce the influence of deformation of the substrate 100 on a relative distance between the detecting plate 11 and the detecting electrode 12; the two detecting plates 11 are asymmetrically arranged with respect to axes of the supporting anchor points 2 to which the detecting plates 11 are connected, and structurally asymmetric parts of the two detecting plates 11 are parallel to each other and in opposite directions; the two detecting plates 11 are used for accessing carrier driving signals with opposite phases and forming a differential driving detection structure, and the detecting electrodes 12 and the detecting plates 11 are arranged at intervals to form a detecting capacitor; the detecting electrodes 12 comprise in-plane detecting electrodes 121 and out-of-plane detecting electrodes; two detecting devices 1 are provided for the accelerometer, the two detecting devices 1 are located in a same plane, the detecting plates 11 in the two detecting devices 1 are perpendicular to each other, and the two detecting plates 11 in the same detecting device 1 are adjacently arranged; when the accelerometer is used for detection, the two detecting plates 11 in the same detecting device 1 generate opposite changes in distance with respect to the detecting electrodes 12 respectively; and the accelerometer obtains a detection result by analyzing a change of differential capacitance between the detecting plates 11 and the detecting electrodes 12.

Figure 3:
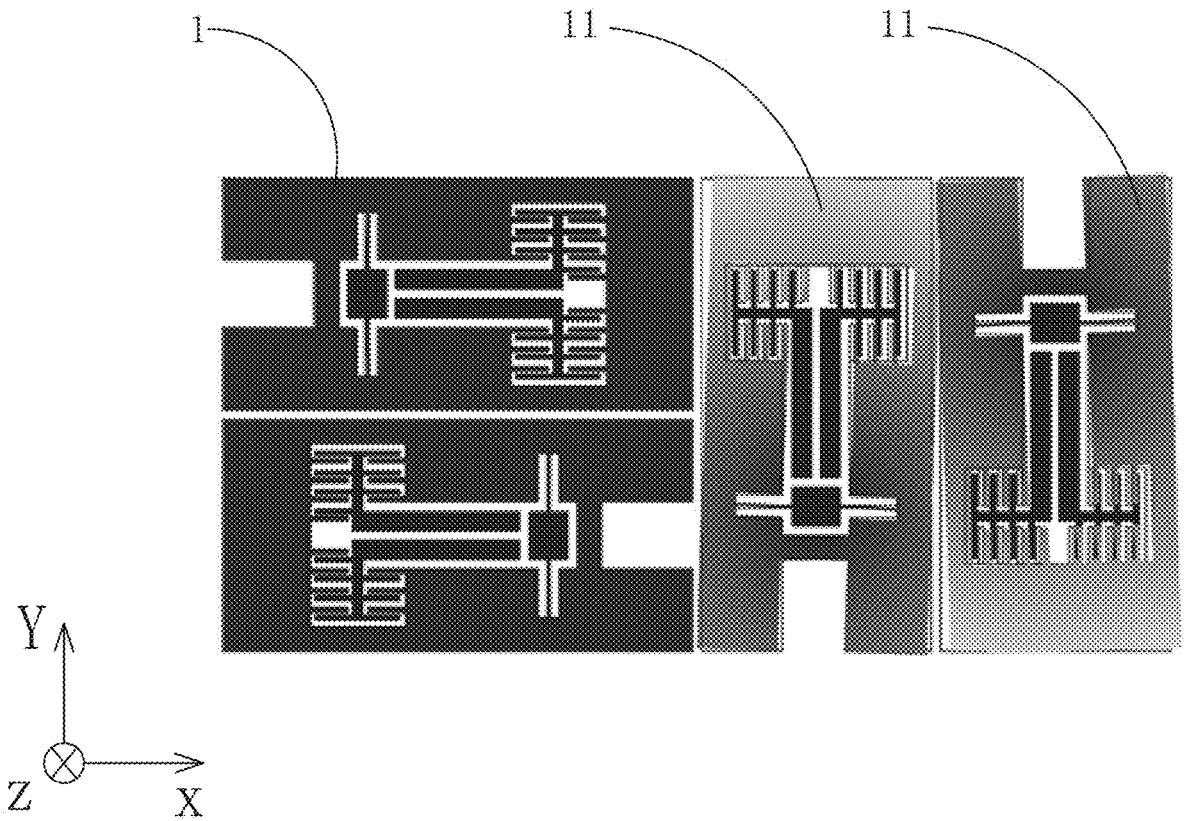
FIG. 3 is a schematic diagram of the detection of motion in a first direction by an accelerometer provided by the present invention.
Figure 4:
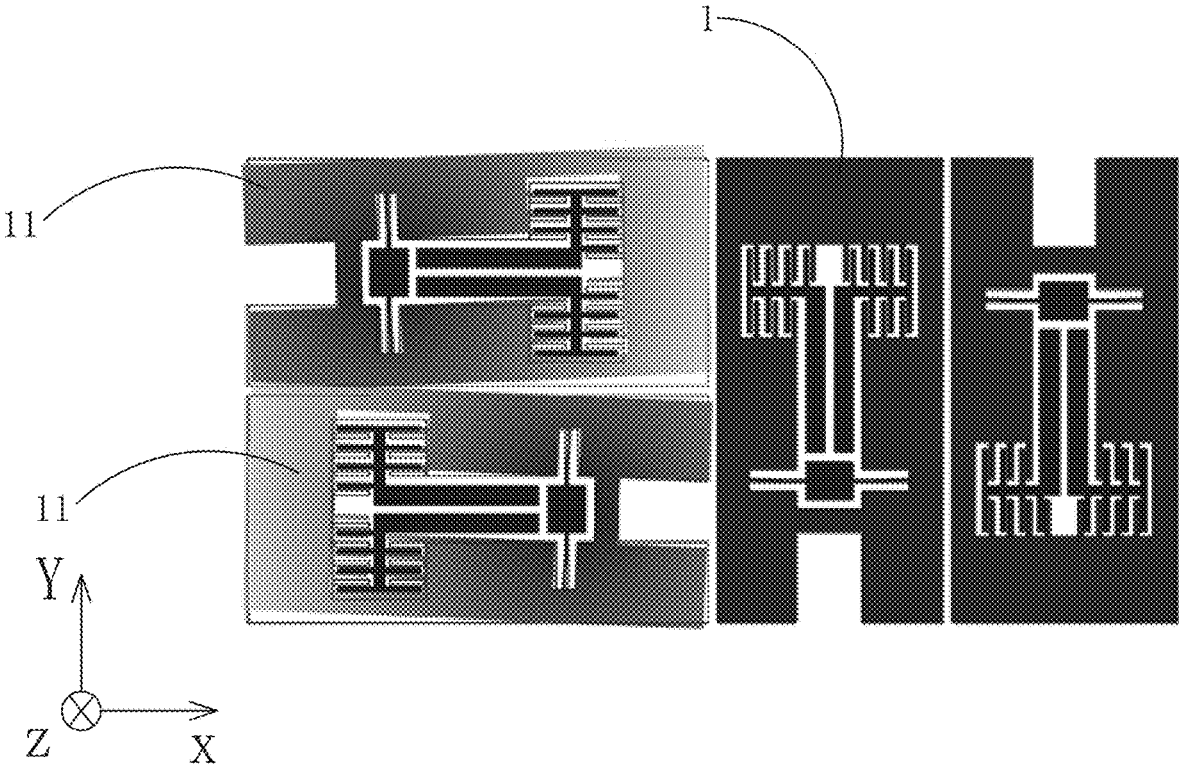
FIG. 4 is a schematic diagram of the detection of motion in a second direction by an accelerometer provided by the present invention.
Figure 5:
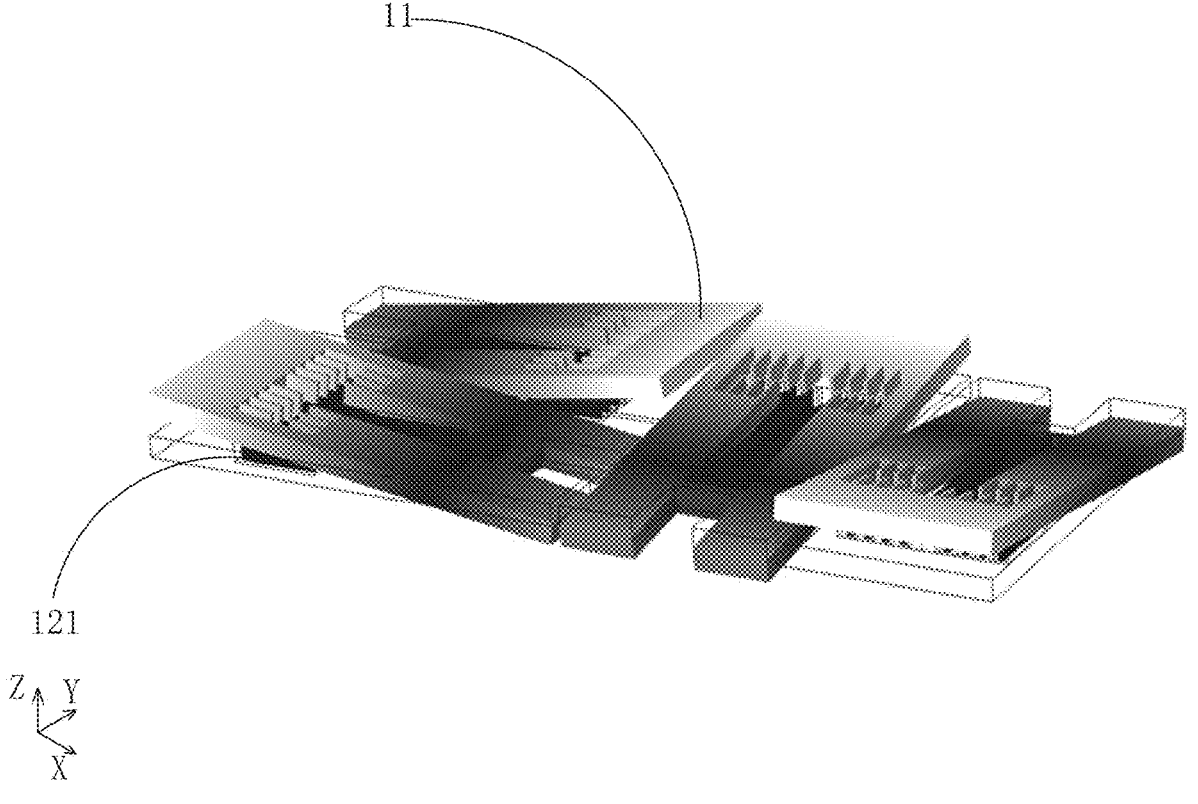
FIG. 5 is a schematic diagram of the detection of motion in a third direction by an accelerometer provided by the present invention.

As shown in FIGS. 3-5, the detecting plate 11 is elastically connected to the supporting anchor point 2, forming a seesaw-like structure, and can move in a first direction X and a second direction Y with respect to the supporting anchor point 2. When the accelerometer is used for detection, the detecting plate 11 can move with respect to the substrate 100 relying on its own inertia, thus changing the position of the detecting plate 11 with respect to the detecting electrode 12. Specifically, the detecting plate 11 will move close to or away from the detecting electrode 12, thereby changing the capacitance between the detecting electrode 12 and the detecting plate 11. Each detecting device 1 has two detecting plates 11, and the structures of the detecting plates 11 are asymmetric with respect to the axes of the supporting anchor points 2 to which the detecting plates 11 are connected, so the two detecting plates 11 of the same detecting device 1 can move in opposite directions. When the accelerometer detects the acceleration in the first direction X or the second direction Y, the two detecting plates 11 of the same detecting device 1 rotate around the supporting anchor point 2 in opposite directions. When the accelerometer detects the acceleration in a third direction Z, the two detecting plates 11 of the same detecting device 1 rotate around the axis of the supporting anchor point 2 in opposite directions.

When the two detecting plates 11 of the same detecting device 1 access carrier driving signals with opposite phases, the accelerometer obtains a detection result by analyzing the change of differential capacitance between the two detecting plates 11 and the detecting electrodes 12 of the same detecting device 1. If the same motion mode as the detection mode is caused by the rotational angular acceleration during detection, and if the substrate 100 tilts due to external interference factors, the two detecting plates 11 rotating around the supporting anchor points 2 in the same direction can offset the influence through the common-mode change of the differential capacitance, reducing the influence of the interference factors on the accelerometer and improving the detection accuracy of the accelerometer. The detecting electrode 12 is connected with the other electrode fixing anchor point 3 through the connecting arm 14, and the electrode fixing anchor point 3 connected with the connecting arm 14 is adjacent to the supporting anchor point 2 connected with the detecting plate 11. When external stress and other factors cause deformation of the substrate, the detection capacitance change caused by the deformation of the substrate will be weakened due to the proximity of the connecting arm 14 and the supporting anchor point 2 connected with the detecting plate 11, thereby improving the anti-interference ability of the accelerometer.

As shown in FIGS. 1 and 2, the two detecting devices 1 are located in the same plane and perpendicular to each other and used for detecting the acceleration in the first direction X and the second direction Y. The detecting plates 11 of the same detecting device 1 are parallel to each other, the detecting plates 11 of different detecting devices 1 are perpendicular to each other, and the two detecting plates 11 of the same detecting device 1 are adjacent to each other, so that a distance between the supporting anchor points 2 of the two detecting plates 11 of the same detecting device 1 is smaller, which reduces the common-mode interference caused by thermal stress and other factors on the substrate 100; further, the wiring of the in-plane detecting electrodes 121 of different detecting devices 1 can be independent of each other to reduce wire crossing and minimize the impact caused by parasitic capacitance resulting from complex wiring, thus further improving the detection accuracy of the accelerometer.

As shown in FIG. 1, in a possible implementation, the detecting plate 11 comprises a hollow mounting area 13, and the in-plane detecting electrode 121 is located in the mounting area 13 to form an in-plane detecting capacitor together with the detecting plate 11. The accelerometer further comprises an upper cover which covers the substrate 100, and the out-of-plane detecting electrode is arranged on the substrate 100 or the upper cover, spaced apart from the detecting plate 11 in the third direction Z, to form an out-of-plane detecting capacitor together with the detecting plate 11.

The detecting plate 11 has a hollow mounting area 13, and the mounting area 13 can be in the shape of a rectangle, a circle or an irregular polygon, and is used for accommodating components such as the detecting electrodes 12, the supporting anchor points 2 and the electrode fixing anchor points 3. The in-plane detecting electrode 121 is arranged in the mounting area 13 and fixedly mounted on the substrate 100, and can form an in-plane detecting capacitor together with the detecting plate 11. The detecting device 1, featuring the support anchor points 2 with axes being perpendicular to the first direction X, is used for detecting the acceleration in the first direction X. The detecting plate 11 can move in the first direction X and change the distance to the corresponding in-plane detecting electrode 121, thereby changing the size of the in-plane detecting capacitor. The same effect can be achieved by the other detecting plate 11 in the same detecting device 1. The two detecting plates work together to obtain the acceleration in the first direction X based on the differential capacitance change and carrier signals. Based on a similar principle, the other detecting device 1 perpendicular to the aforementioned detecting device can be used for obtaining the acceleration in the second direction Y.

The out-of-plane detecting electrodes are arranged on one sides of the detecting plates 11 at intervals in the third direction Z. When the accelerometer detects the acceleration in the third direction Z, the detecting plate 11 can rotate around a rotating shaft of the supporting anchor point 2. Because the structures of the detecting plates 11 of the same detecting device 1 are not symmetrically distributed along the axes of the supporting anchor points 2, the two detecting plates 11 are parallel to each other, and the parts, asymmetric with respect to the axes of the supporting anchor points 2, of the two detecting plates are arranged oppositely in the first direction, the two detecting plates 11 will rotate in opposite directions around the supporting anchor points 2 when detecting the acceleration in the third direction Z; in this way, the detecting plates form the out-of-plane detecting capacitors together with the out-of-plane detecting electrodes respectively, and the two detecting plates work together to obtain the acceleration in the third direction Z based on the change of differential capacitance and carrier signals. Based on a similar principle, the other detecting device 1 can be used for obtaining the acceleration in the third direction Z, thus improving the detection accuracy and anti-interference ability of the accelerometer.

As shown in FIG. 1, in a possible implementation, the detecting plate 11 has a plurality of detecting parts 111 inside the mounting area 13, the plurality of detecting parts 111 are arranged at intervals in an axial direction of the supporting anchor point 2, the in-plane detecting electrode 121 has a plurality of fitting parts 121*a* arranged at intervals, and the detecting parts 111 and the fitting parts 121*a* cooperate with each other to form an in-plane detecting capacitor.

A plurality of detecting parts 111 are spaced apart in a tooth-like distribution, a plurality of fitting parts 121*a* are arranged on the in-plane detecting electrode 121 at intervals correspondingly, and the fitting parts 121*a* and the detecting parts 111 are spaced apart from each other and parallel to each other to form in-plane detecting capacitors. When the detecting plate 11 moves in the first direction X or the second direction Y, the distance between the detecting part 111 and the fitting part 121*a* changes, and the in-plane detecting capacitor changes accordingly, thus realizing the acceleration detection function. The plurality of detecting parts 111 and the fitting parts 121*a* form the plurality of in-plane detecting capacitors, thereby improving the detection sensitivity and accuracy.

As shown in FIG. 1, in a possible implementation, each detecting plate 11 comprises two in-plane detecting electrodes 121 which are connected with two electrode fixing anchor points 3 through connecting arms 14 respectively, and the two in-plane detecting electrodes 121 are symmetrically arranged and spaced in the axial direction of the supporting anchor point 2.

The same detecting device 1 is provided with a plurality of in-plane detecting electrodes 121, and the two in-plane detecting electrodes 121 can be arranged in parallel to each other to detect the acceleration in the same direction, and can perform detection separately and then apply a differential operation, thereby further improving the anti-interference ability and detection sensitivity.

As shown in FIG. 1, in a possible implementation, the connecting arm 14 and the electrode fixing anchor point 3 are located in the mounting area 13, and the connecting arm 14 connects the in-plane detecting electrode 121 with the electrode fixing anchor point 3.

The connecting arm 14 is used for connecting the in-plane detecting electrode 121 and fixing it on the substrate 100. The supporting anchor point 2 connected to the connecting arm 14 is adjacent to the electrode fixing anchor point 3 connected to the detecting plate 11. When the substrate 100 is deformed due to factors such as temperature or external stress, the capacitance change caused by the deformation of the substrate 100 will be weakened due to the proximity of the supporting anchor point 2 and the electrode fixing anchor point 3. Consequently, the interference of stress generated by the deformation of the substrate 100 caused by external factors is minimized, thereby improving the detection stability of the accelerometer.

In a possible implementation, the two electrode fixing anchor points 3 connected to the in-plane detecting electrodes 121 are located on a same side of the axis of the supporting anchor point 2 connected to the detecting plate 11.

When the accelerometer detects the in-plane motion speed, the detecting plate 11 will rotate around the supporting anchor point 2 connected thereto, and the parts, located on two sides of the supporting anchor point 2, of the detecting plate 11 will move in opposite directions. When the two electrode fixing anchor points 3 connected to the in-plane detecting electrodes 121 are located on the same side of the supporting anchor point 2 connected to the detecting plate 11, the plurality of in-plane detecting electrodes 121 can also be located on the same side of the supporting anchor point 2 connected to the detecting plate 11, so that the in-plane detecting capacitors can be changed in the same way, facilitating the detection of in-plane acceleration by the accelerometer.

As shown in FIG. 1, in a possible implementation, the detecting electrodes 12 comprise a plurality of out-of-plane detecting electrodes, and the plurality of out-of-plane detecting electrodes corresponding to the same detecting plate 11 are arranged on two sides of the axis of the supporting anchor point 2.

At least two out-of-plane detecting electrodes are correspondingly arranged on the same detecting plate 11, and the out-of-plane detecting electrodes are symmetrically distributed along the axis of the supporting anchor point 2. When the detecting plate 11 rotates around the axis of the supporting anchor point 2, the distance between the detecting plate 11 and the out-of-plane detecting electrode on one side of the supporting anchor point 2 increases, the distance between the detecting plate 11 and the out-of-plane detecting electrode on the other side decreases, and the out-of-plane detecting capacitance between the detecting plate 11 and the out-of-plane detecting electrode changes. For example, out-of-plane detecting electrodes are arranged at intervals on a detecting plate 11 in the third direction Z to form out-of-plane detecting capacitors $C_{Z1}$ and $C_{Z5}$, which are located on two sides of the axis of the supporting anchor point 2, or a plurality of out-of-plane detecting electrodes can be arranged on the same side of the supporting anchor point 2 to form a plurality of out-of-plane detecting capacitors, so as to further improve the detection sensitivity. The other detecting plate 11 of the same detecting device 1 is provided with out-of-plane detecting capacitors $C_{Z2}$ and $C_{Z6}$, the change trends of $C_{Z1}$ and $C_{Z2}$ are opposite, and their corresponding out-of-plane detecting electrodes are connected with each other to form differential capacitors with $C_{Z1}$ and $C_{Z2}$, thereby improving the detection accuracy. Based on a similar principle, the corresponding detecting plate 11 on the other detecting device 1 can be provided with out-of-plane detecting capacitors $C_{Z3}$, $C_{Z4}$, $C_{Z7}$ and $C_{Z8}$, and the acceleration can also be detected by forming differential capacitors. The corresponding differential out-of-plane detecting capacitors of the two detecting devices 1 are interconnected, which enhances the sensitivity of Z-axis acceleration detection. Both detecting devices 1 can detect the acceleration in the third direction Z, thus improving the detection accuracy of the accelerometer.

In a possible implementation, the in-plane detecting electrodes 121 located in different detecting plates 11 in the same detecting device 1 are connected to each other.

The two detecting plates 11 in the same detecting device 1 will move in different directions during detection, for example, the two detecting plates 11 will move oppositely in the first direction X or in the second direction Y. Therefore, when the in-plane detecting electrodes 121 corresponding to the detecting plates 11 moving in two directions are connected, detection differential capacitors can be formed, and the acceleration can be detected based on the change of the detection differential capacitors, thus improving the detection accuracy. The wiring of the in-plane detecting electrodes 121 of different detecting devices 1 will also be simpler, and wire crossing can be reduced, thus reducing the influence of crosstalk and parasitic capacitance caused by wire crossing.

As shown in FIGS. 1 and 2, in a possible implementation, two ends of the two detecting plates 11 of the same detecting device 1 are respectively aligned.

The alignment of the two detecting plates 11 of the same detecting device 1 can reduce the overall size of the detecting device 1, thus reducing the size and occupied space of the detecting device 1. When the detecting plates 11 are rectangular, the overall shape of the detecting device 1 is also rectangular after the two ends of the detecting plates 11 are respectively aligned. When the two detecting devices 1 are vertically arranged, alignment can also be realized, and the accelerometer as a whole can form a rectangular shape, so as to save space.

In a possible implementation, the length of the detecting plate 11 is twice its width.

The accelerometer comprises two detecting devices 1. The detecting plates 11 of different detecting devices 1 are arranged vertically to each other. The detecting plates 11 of one detecting device are parallel to the first direction X, and the detecting plates 11 of the other detecting device are parallel to the second direction Y. The length of one detecting plate 11 is twice the width of the other. When the two detecting devices 1 are arranged adjacent to each other, space can be saved. For example, when the detecting plate 11 is rectangular, the whole detecting device 1 is in a positive direction, allowing the two detecting devices 1 to be arranged adjacent to each other.

An elastic torsion spring 4 is used for connecting the detecting plate 11 and can provide the detecting plate 11 with in-plane and out-of-plane freedom. The torsion spring 4 can be a straight beam or an L-shaped, U-shaped or S-shaped composite beam. In case of a plurality of electrode fixing anchor points 3, the plurality of electrode fixing anchor points 3 are arranged close to each other and distributed symmetrically with respect to a center of the supporting anchor point 2 or into an array. The torsion spring 4 allows the detecting plates 11 to make in-plane and out-of-plane rotation, and return to their initial positions, keeping them parallel to the detecting electrodes 12.

On the basis of the above structure of the accelerometer, a specific embodiment of the accelerometer is provided below.

As shown in FIGS. 1 and 2, an accelerometer comprises two detecting devices 1 which are perpendicular to each other, and each detecting device 1 comprises two detecting plates 11 which are arranged in parallel and in opposite directions. The detecting plates 11 are elastically connected with a substrate 100 through supporting anchor points 2, and the structures of the detecting plates 11 are asymmetrical with respect to the axes of the supporting anchor points 2. Detecting electrodes 12 and the detecting plates 11 are arranged correspondingly. When the accelerometer is in a stable state, the detecting electrodes 12 are parallel to the detecting plates 11. When the accelerometer is in an acceleration application state or an acceleration action state in a corresponding detection direction, the two detecting plates 11 in the same detecting device 1 generate opposite changes in distance relative to the detecting electrodes 12. The two detecting devices 1 are used for detecting the acceleration in two perpendicular in-plane directions and the out-of-plane direction.

As shown in FIG. 3, when the accelerometer detects the acceleration in a first direction X, the two detecting plates 11 of one detecting device 1 respectively access carrier driving signals with opposite phases, where one accesses a forward carrier driving signal $V_p$, and the other accesses a reverse carrier driving signal $-V_p$. The two detecting plates 11 rotate in opposite directions around their supporting anchor points 2, so that torsion springs 4 for fixing the two detecting plates 11 are bent oppositely in the first direction X. This changes the distance between the detecting plate 11 and the detecting electrode 12 in the first direction X, further altering the capacitance between the detecting plate 11 and the detecting electrode 12 and generating a differential capacitor. The accelerometer obtains a detection result by analyzing a change of the differential capacitor and the carrier driving signals.

As shown in FIG. 4, when the accelerometer detects the acceleration in a second direction Y, the two detecting plates 11 of the other detecting device 1 respectively access carrier driving signals with opposite phases, where one accesses a forward carrier driving signal $V_p$, and the other accesses a reverse carrier driving signal $-V_p$. Torsion springs 4 for fixing the two detecting plates 11 are bent oppositely in the second direction Y, and the two detecting plates 11 rotate in opposite directions around their supporting anchor points 2. This changes the distance between the detecting plate 11 and the detecting electrode 12 in the first direction X, further altering the capacitance between the detecting plate 11 and the detecting electrode 12 and generating a differential capacitor. The accelerometer obtains a detection result by analyzing a change of the differential capacitor and the carrier driving signals.

As shown in FIG. 5, when the accelerometer detects the acceleration in a third direction Z, the detecting plates 11 of both detecting devices 1 will rotate around the axes of the supporting anchor points 2. Specifically, the detecting plates 11 of one detecting device will rotate around the first direction X, while the detecting plates 11 of the other detecting device will rotate around the second direction Y, and the two detecting plates 11 of the same detecting device 1 rotate in opposite directions, thus changing the distance between the detecting plates 11 and the detecting electrodes 12, so as to form the differential capacitors. The accelerometer obtains a detection result by analyzing a change of the differential capacitor and the carrier driving signals.

The two detecting plates 11 of the detecting device 1 are arranged adjacent to each other, allowing the wiring of the detecting electrodes 12 to be separated. For example, an in-plane detecting electrode $S_{Y1}$ and an in-plane detecting electrode $S_{Y2}$ are respectively arranged on the two detecting plates 11 of one detecting device 1. Because the two detecting plates 11 are arranged adjacent to each other, the wiring distances between the in-plane detecting electrodes $S_{Y1}$ and $S_{Y2}$ of different detecting devices 1 are shorter, and wire crossing can be reduced, thereby reducing the influence of parasitic capacitance caused by wire crossing and improving the detection accuracy of the accelerometer.

Specifically, the in-plane detecting electrodes 12 are arranged in a mounting area 13 of the detecting plate 11. By placing an electrode fixing anchor point 3 of the detecting electrode 12 close to the supporting anchor point 2 arranged on the detecting plate 11, when the substrate 100 is deformed due to external factors, the capacitance change caused by the deformation of the substrate 100 will be weakened due to the small distance between the supporting anchor point 2 and the electrode fixing anchor point 3, thereby improving the anti-interference ability of the accelerometer and improving the detection stability.

Foregoing descriptions are only optional embodiments of the present application and are not intended to limit the present application. For those skilled in the art, the present application may have various modifications and changes. Any modification, equivalent substitution, improvement, etc. made based on the spirit and principle of the present application should be included in the protection scope of the present application.

What is claimed is:

1. An accelerometer, comprising:
a substrate provided with a plurality of anchor points, the anchor points at least comprising supporting anchor points and electrode fixing anchor points which are arranged adjacently; and
detecting devices, each comprising two detecting plates and corresponding detecting electrodes, the detecting electrodes being connected to the electrode fixing anchor points through connecting arms, and the corresponding detecting plate being elastically connected to the supporting anchor point adjacent to the electrode fixing anchor points, to reduce the influence of deformation of the substrate on a relative distance between the detecting plate and the detecting electrode; the two detecting plates being asymmetrically arranged with respect to axes of the supporting anchor points to which the detecting plates are connected, and structurally asymmetric parts of the two detecting plates being parallel to each other and in opposite directions; the two detecting plates being used for accessing carrier driving signals with opposite phases and forming a differential driving detection structure, the detecting electrodes and the detecting plates being arranged at intervals to form a detecting capacitor, and the detecting electrodes comprising in-plane detecting electrodes and out-of-plane detecting electrodes;
wherein the accelerometer is provided with two said detecting devices, the two detecting devices are located in a same plane, the detecting plates in the two detecting devices are perpendicular to each other, and the two detecting plates in the same detecting device are adjacently arranged; when the accelerometer is used for detection, the two detecting plates in the same detecting device generate opposite changes in distance with respect to the detecting electrodes respectively; and the accelerometer obtains a detection result by analyzing a change of differential capacitance between the detecting plates and the detecting electrodes.

2. The accelerometer according to claim 1, wherein two ends of the two detecting plates of the same detecting device are respectively aligned.

3. The accelerometer according to claim 1, wherein the detecting plate comprises a hollow mounting area, the in-plane detecting electrode is located in the mounting area to form an in-plane detecting capacitor together with the detecting plate, the accelerometer further comprises an upper cover which covers the substrate, and the out-of-plane detecting electrode is arranged on the substrate or the upper cover, spaced apart from the detecting plate, to form an out-of-plane detecting capacitor together with the detecting plate.

4. The accelerometer according to claim 3, wherein the detecting plate has a plurality of detecting parts inside the mounting area, the plurality of detecting parts are arranged at intervals in an axial direction of the supporting anchor point, the in-plane detecting electrode has a plurality of fitting parts arranged at intervals, and the detecting parts and the fitting parts cooperate with each other to form an in-plane detecting capacitor.

5. The accelerometer according to claim 3, wherein the detecting electrodes comprise a plurality of out-of-plane detecting electrodes, and the plurality of out-of-plane detecting electrodes corresponding to the same detecting plate are arranged on two sides of the axis of the supporting anchor point.

6. The accelerometer according to claim 3, wherein the in-plane detecting electrodes located in different detecting plates in the same detecting device are connected to each other.

7. The accelerometer according to claim 3, wherein each detecting plate comprises two in-plane detecting electrodes, the connecting arms and the electrode fixing anchor points are located in the mounting area, the two in-plane detecting electrodes are connected with the two electrode fixing anchor points through the connecting arms respectively, and the two in-plane detecting electrodes are symmetrically arranged and spaced in an axial direction of the supporting anchor point.

8. The accelerometer according to claim 7, wherein the two electrode fixing anchor points connected to the in-plane detecting electrodes are located on a same side of the axis of the supporting anchor point connected to the detecting plate.

* * * * *